United States Patent [19]
Plumb et al.

[11] Patent Number: 6,078,867
[45] Date of Patent: Jun. 20, 2000

[54] METHOD AND APPARATUS FOR GENERATION OF 3D GRAPHICAL BOREHOLE ANALYSIS

[75] Inventors: Richard Plumb, Houston; Christoph Ramshorn, Austin, both of Tex.; Bjoern Zehner, Freiburg, Germany

[73] Assignee: Schlumberger Technology Corporation, Sugar Land, Tex.

[21] Appl. No.: 09/056,914

[22] Filed: Apr. 8, 1998

[51] Int. Cl.$^7$ ........................................ G06F 19/00
[52] U.S. Cl. ............................................... 702/6
[58] Field of Search ................... 702/6, 7, 8, 9; 324/338, 379; 367/73, 72

[56] References Cited

U.S. PATENT DOCUMENTS 5,081,611  1/1992  Hornby ........................ 702/6
5,638,337  6/1997  Priest .......................... 702/6

Primary Examiner—Donald E. McElheny, Jr.
Attorney, Agent, or Firm—Douglas Y'Barbo

[57] ABSTRACT

A system and method is disclosed for generating an oriented three-dimensional graphical representation of a borehole. A system is implemented for receiving oriented caliper and borehole trajectory data taken by a 4-arm (or more) caliper device relating to a borehole. This information is used to generate an oriented three-dimensional wire mesh model of the borehole and color map the generated three-dimensional wire mesh model using the caliper data and gamma ray (or other lithology indicator) to reflect one or both of the orientation of borehole ellipticity or the lithology of the borehole.

30 Claims, 4 Drawing Sheets

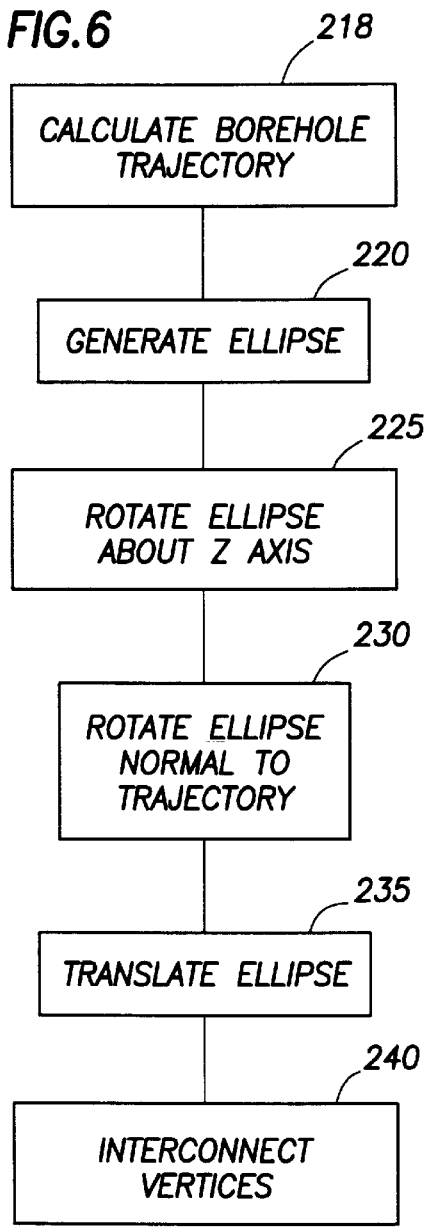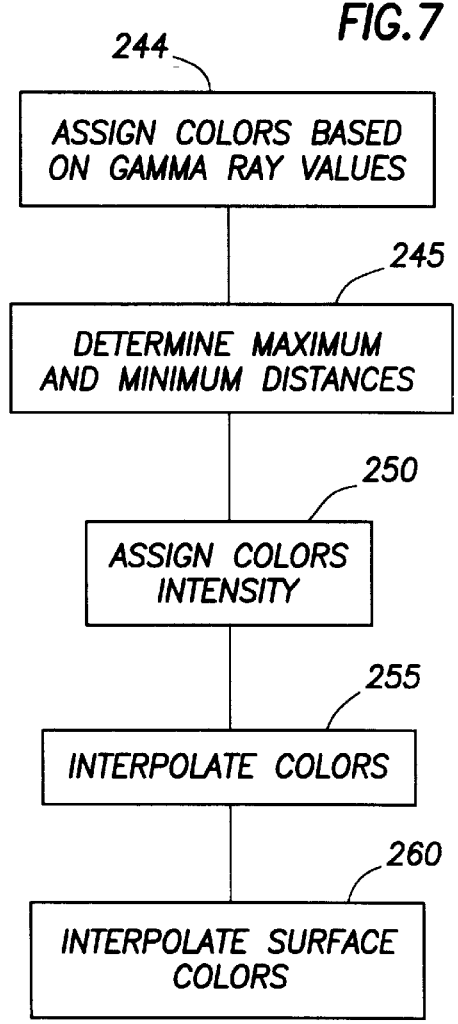

METHOD AND APPARATUS FOR GENERATION OF 3D GRAPHICAL BOREHOLE ANALYSIS

BACKGROUND OF THE INVENTION

1. Technical Field of the Invention

The present invention relates to borehole analysis, and more particularly, to a system and method for generating a 3D graphical representation of information pertaining to a borehole for failure analysis purposes.

2. Description of Related Art

During the drilling of boreholes, problems will many times develop involving breakouts or collapses within the borehole. Breakouts occur when one side of a borehole breaks down or collapses. A collapse involves a complete loss of integrity of the borehole side walls. Breakouts and collapses cause downtime for the rig drilling the borehole and are highly undesirable due to the costs involved with downtime problems. In order to overcome the problems caused by breakouts and collapses, correct and fast diagnosis of the causes of the borehole failure are necessary in order to reduce the rig downtime and prevent future problems.

Current diagnosis of borehole failures is done by interpreting two dimensional log curve data. The use of two dimensional log curves can disburse various diagnostic features from the data over several curves making the data difficult to interpret. Wellbore failure analysis using caliper data is difficult because the interpreter must create a mental picture of the wellbore by integration information from six logs, namely the gamma ray log (lithology); caliper arms 1/3, and 2/4 to determine the cross-sectional shape of the borehole and which diameter is a long axis; the orientation of the caliper 1 and 3 arm to determine the orientation of a long axis and to check if the tool rotation has stopped in the elongated section; the deviation angle of the borehole to determine if the wellbore section is vertical or inclined; and the deviation azmuith to determine if the elongation direction is correlated with the highside of the wellbore and therefore may not be a stress induced elongation and so remedial action may be very different. This process must be completed for every depth sample along the borehole, typically six inches. In practice, this interpretation process must be done whenever the borehole geometry changes.

It should be appreciated by those skilled in the art, that this is a tedious process that is not rigorously applied. This makes determinations of the reasons for a borehole failure much more difficult. Thus, some method of producing a three-dimensional model that allows one to visually correlate all of these variables would be greatly appreciated. Existing 3D visualizations and borehole renderings utilize UBI (ultrasonic borehole imager tool) data to generate the 3D images. However, none of these existing 3D techniques have provided the type of data necessary to support a rigorous borehole failure mode analysis. Thus, a technique for generating a 3D representation of a borehole that supports borehole failure mode analysis is greatly desired.

SUMMARY OF THE INVENTION

The present invention overcomes the foregoing and other problems with a system and method for generating a 3D graphical representation file of a borehole. The system is configured to receive both caliper data relating to a borehole and user input variables for controlling the manner in which the caliper data is processed to generate the 3D graphical representation file. While the present invention utilizes 4-arm caliper data in its preferred embodiment, it is envisioned that the 3D model described herein can be implemented using data from tools that record more caliper measurements. For example, the UBI (ultrasonic borehole imager, a trademark of Schlumberger) records caliper measurements every 2.6 degrees around the borehole. The caliper data is first used to generate a three-dimensional wire mesh model. This is accomplished by first calculating a trajectory of the borehole at selected depths measured by the caliper data. At each measured depth, an ellipse is generated normal to the calculated trajectory of the borehole having axes scaled according to the caliper data and a number of vertices identified by user provided variables. The ellipses are interconnected by attaching their vertices to provide the three-dimensional wire mesh model of the borehole. The model is generated within a bounding box defining the x and y axes of the box in the north/south and east/west directions and a z axes in the vertical direction.

Once the three-dimensional wire mesh model is generated, the model is color mapped according to borehole ellipticity and lithology. The vertices of the wire mesh model are first colored according to the lithology of the hole. The intensity of the colors are then assigned according to borehole ellipticity. The distances between each vertices of the ellipses and the center of the ellipses are calculated. From these calculations the maximum and minimum distances within an ellipse are determined. The maximum distances are assigned a first color intensity, and the minimum distance are assigned a second color intensity. Interpolation techniques are used to determine the colors and intensity for the remaining vertices based upon the colors of the maximum and minimum distance colored vertices. Other colors are assigned to vertices of the wire mesh model based upon gamma ray tool value measurements in the caliper data. The 3D graphics representation file may also include an indication of the orientation of caliper arm 1 at each depth of the borehole and an indication of the high side of the borehole when the borehole trajectory is non-vertical. Alternatively, the model may be color mapped based on borehole lithology. In this case, gamma ray tool values recorded at the same depth locations as the caliper measurements are used to assign colors to the vertices.

BRIEF DESCRIPTION OF THE DRAWINGS

For a more complete understanding of the present invention, reference is made to the following Detailed Description taken in conjunction with the accompanying drawings wherein:

FIG. 6 is a flow diagram illustrating the method for creating the quadrangle mesh model of the borehole; and FIG. 7 is a flow diagram illustrating the method for color mapping the mesh model of the borehole.

DETAILED DESCRIPTION OF THE INVENTION

Figure 1:
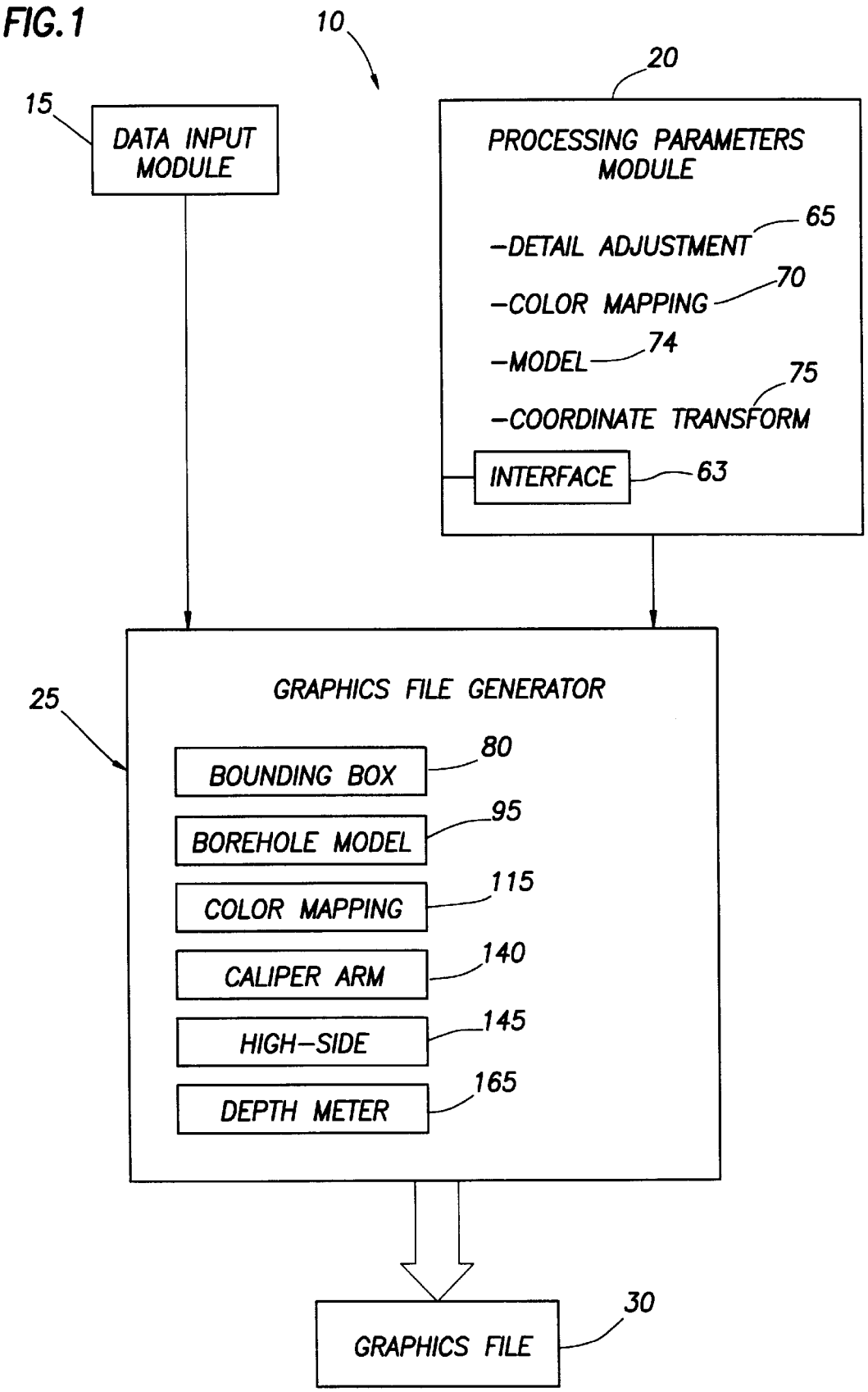
FIG. 1 is a functional block diagram of a system for generating the 3D graphical representation of a borehole.

Referring now to the Drawings, and more particularly to FIG. 1, there is illustrated a functional block diagram of a system for generating a 3D graphical representation for use in borehole stability analysis. The present invention preferably comprises a computer program, executable by a processor, implemented on a computer readable storage medium in the highly portable Java programming language. However, the program may be implemented in any programming language. The 3D graphical rendering system 10 includes a data input module 15 enabling the reading of data files containing caliper data, a processing parameters module 20 enabling the system operator to specify the manner in which the caliper data received by the data input module 15 is processed and a graphics file generator 20 responsive to the received caliper data and the set processing parameters to output a 3D graphics file 30 in the VRML 1.0, VRML 2.0, Open Inventor 2.1 or other graphics file formats. While the present invention is discussed with respect to generation of a graphics file for display, any manner of displaying or representing a graphics representation could be used.

The data input module 15 is capable of receiving and reading a variety of azimuthal caliper or ultrasonic caliper data measurements (4-arm, 6-arm, etc.) including borehole depth, borehole azimuth, borehole deviation, tool orientation, 2 borehole diameters, gamma ray tool values, and dip meter data. While the present invention is described with respect to the use of 4-arm caliper data, it should be realized that either 4-arm, 6-arm caliper data or other caliper measurements may be used to generate the 3D visualization of the borehole according to the present invention. For example, a UBI tool makes 140 caliper measurements around the borehole.

The received 4-arm caliper data is processed as designated by the processing parameters module 20 in response to user input through a user interface 63. The processing parameters module 20 includes a function 65 enabling adjustment of the level of detail of graphics produced by the graphics file generator 25. This is useful when viewing 3D graphics files 30 on PCs that do not include 3D graphics acceleration support or to support a level-of-detail modeling for real-time graphics environments. The user may also use a color mapping function 70 to set the color mapping generated by the graphics file generator 25 such that the generated 3D borehole graphics may be color mapped to define the ellipticity and lithology of the generated borehole representation. A model function 74 enables designation of parameters relating to the generation of a quadrangle mesh model of the borehole. A coordinate system transform function 75 enables a user to alter the coordinate system of the bounding box in which a 3D representation of the borehole is presented to help interpret elongation direction. For example, lithology is shown by color and the magnitude of the caliper difference in the orientation of the long-axis is shown by color intensity at the appropriate azimuth. By entering azimuth and depth information of the first two axis of a new coordinate system, the new coordinate system may be used to map the borehole shape, for example, a coordinate system defined by the local stress or strain field on the borehole. The option of changing the reference coordinate system is an important aid for determining the cause of borehole elongation. For example, by defining a coordinate system of the bounding box to be aligned with the regional stress direction, one can easily determine if the direction of the longation is related to the regional earth stress. Similarly, one can determine if a elongation is related to geologic structure by aligning the coordinates of the bounding box with the geologic structure and displaying the formation dips.

Figure 2:
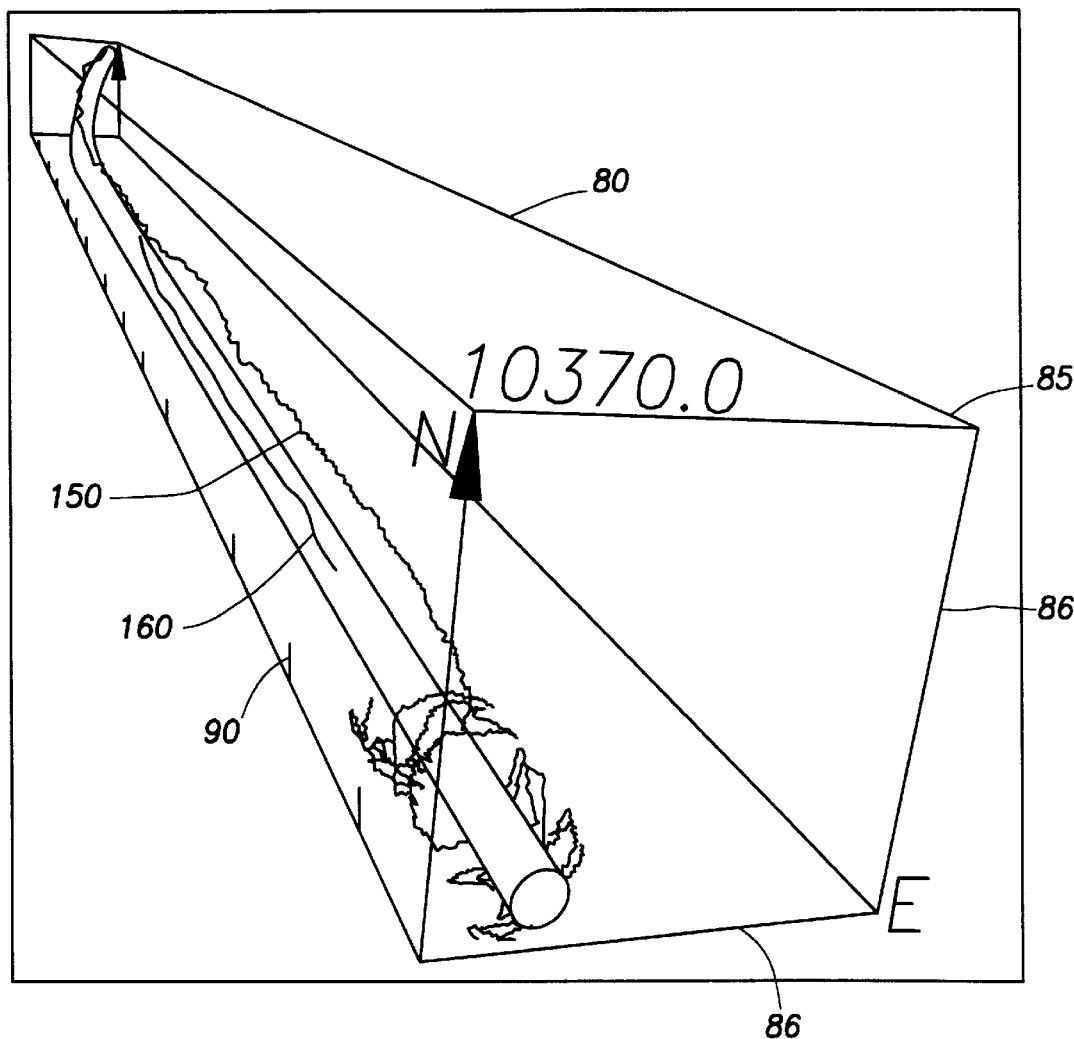
FIG. 2 is a 3D graphical representation of a borehole generated according to the present invention.

Referring now also to FIG. 2, the graphics file generator 25 includes a variety of sub-modules enabling generation of the various portion of a 3D graphics representation 78 of a borehole. Initially, a bounding box function 80 uses the data received by the data input module 15 to render a bounding box 85. The short sides 86 of the bounding box 85 are default aligned with the geographic north/south and east/west directions. The long side 80 of the bounding box 85 is vertically aligned. The bounding box 85 further includes depth data written next to each bounding box depth along the borehole. Tick marks 90 are spaced at fifty foot increments along the long side 88 of the box 85.

Figure 3:
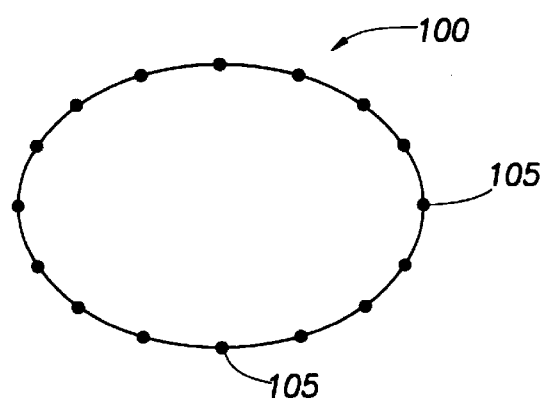
FIG. 3 is an illustration of an ellipse used to generate the borehole model.
Figure 4:
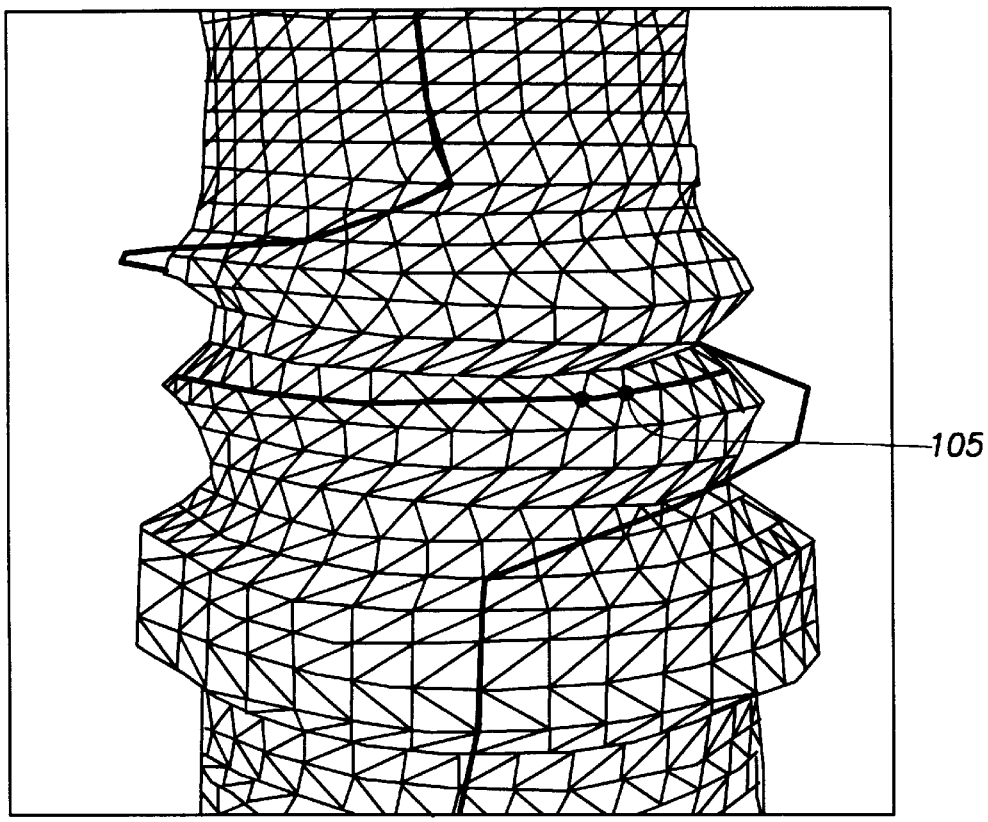
FIG. 4 is a quadrangle mesh model of a borehole.

The color coded 3D model will illustrate the location and lithology where a borehole has failed. The color intensity highlights the elongation direction, if any, and inspection of the colored model shows if there are one or more failure mechanisms responsible for the instability. However, color coding alone does not provide enough information to determine the probable cause of failure. Once the bounding box 85 has been defined, a borehole shape function 95 generates a 3D quadrangle mesh model of the borehole. The borehole model function 95 utilizes the 4-arm caliper data including depth of the borehole, azimuth of the borehole, deviation of the borehole from the vertical direction, the azimuth of caliper arm 1 and the diameter measured by both caliper arms 1 and 3, and caliper arms 2 and 4 to generate a wire mesh model. The trajectory of the borehole at any particular point is determined from the depth, azimuth and deviation data. The borehole shape is approximated by fitting an ellipse 100 (FIG. 3) which is oriented according to the tool inclinometry measurements which define the trajectory of the borehole. The size of the ellipse 100 approximates the borehole by having the long and short axis of the ellipse associated with the diameter measurements provided by the 4-arm caliper diameter measurements for arms 1/3 and arms 2/4. A single ellipse 100 is computed for each measured depth and oriented to be centered at and normal to the borehole trajectory. The ellipses 100 are approximated by polygons as illustrated in FIG. 3 having a user-specified number of vertices 105. The number of vertices 105 may be specified within the processing parameters module 20 by the model function 74. The resulting stack of ellipses 100 approximating the shape of the borehole are then used to construct a quadrangle mesh as illustrated in FIG. 4. Each node of the mesh is represented by one of the polygon vertices 105.

A color mapping function 115 maps colors to every node point of the quadrangle mesh. The coloring scheme is assigned according to lithology and ellipticity of the borehole. Lithology is determined by using a user defined gamma ray cutoff value provided by the set parameters module 20 and the input gamma ray tool data. High gamma ray values indicate a particular lithology, typically shale. For purposes of geomechanic interpretation, shale is a rock where the continuous load-bearing solid phase is made up of clay minerals. A low gamma ray value (e.g, below the gamma ray cutoff value) is typically sandstone where the continuous load-bearing solid phase is made up of quartz grains. High gamma ray values are associated with a borehole matrix supported by rock and are normally represented in a first color (typically blue), while low gamma ray values are associated with a grain supported borehole matrix and represented by a second color (typically red). The ellipticity of the borehole is emphasized by utilizing saturated colors where the surface is close to the long diameter of the ellipse and by gradually less saturated colors away from these locations. A gray colored surface indicates closeness to the shorter diameter of the ellipse. While the preferred embodiments of the invention includes the colors described above as illustrating an lithology and ellipticity, it should be realized that any other colors are of course interchangeable with those discussed above for purposes of the present invention.

The color mapping function 115 also determines the assigned colors for borehole vertices 105 based on ellipticity. This is accomplished by calculating for each ellipse 100, the distance from every vertex 105 within the ellipse to the center of the ellipse. The maximum distance is assigned a first color, for example, saturated (bright) red or saturated blue, depending on the gamma ray value and ellipticity coloring scheme. The minimum distance is assigned a second color (light red or light blue). Thus, the orientation of the long-axis is easily recognized both from the first colored part of the borehole, while the orientation of the short-axis can be seen from the second colored part of the borehole. The vertices (node points) 105 between these values are assigned colors between the two extremes using a linear interpolation technique. Thus, colors would gradually change from the first to the second color as you move from the long to the short axis. The colors of the surfaces between the node points are interpolated from the colors of the node points in a similar fashion.

If the borehole is nearly vertical, the orientation of the long and short axis may be random and any resulting color mapping would be very confusing. In order to avoid this problem, the user may specify within the color mapping function 70 of the parameter processing module 20 a threshold for the long-axis/short-axis ratio. If the actual ratio is below the threshold, the same intensity color is assigned to every node of the mesh at the location in question.

The caliper arm function 140 and high-side function 145 provide further refinements for the 3D graphical representation of the borehole. The caliper arm function 140 generates a line 150 (FIG. 2) next to the borehole to indicate the orientation of caliper arm 1 at any particular depth. The high-side function 145 generates a line 160 which runs along the high-side of the borehole when the borehole is not vertical. The line 160 is computed by intersecting a vertical planer band following the borehole azimuth with the upper part of the borehole. A depth meter function 165 assigns a depth value along the borehole and inserts dip values at the depths where the dips were measured. The dip value comprises the greatest angle between the plane and horizontal reference plane.

Figure 5:
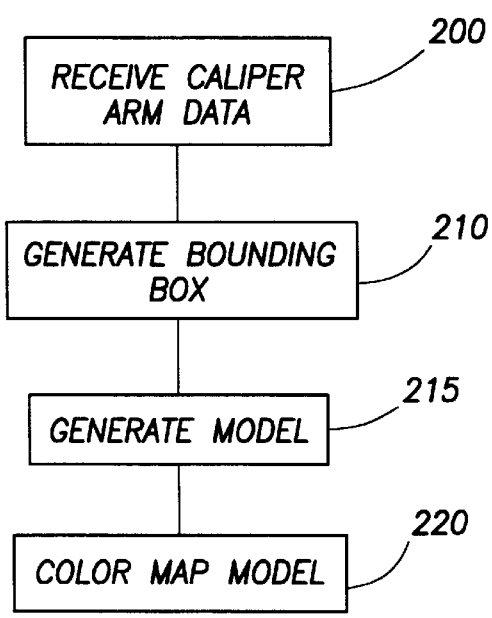
FIG. 5 is a flow diagram describing the method for generating 3D graphical representation of FIG. 2.

Referring now to FIG. 5, there is illustrated a flow diagram describing the general method for generating the 3D graphical representation of the borehole. The caliper arm data is received at step 200. This data is used along with user designated parameters to generate at step 205 a bounding box for the borehole. Next, at step 210 the 3-D quadrangle mesh representing the borehole shape is generated within the bounding box from the received caliper data and user designated parameters. This process will be more fully described with respect to FIG. 6. Finally, the generated borehole shape is color mapped at step 215 to provide a visual representation of the desired analysis data. This may be done by color mapping both the ellipticity of the borehole as more fully described in FIG. 7 and the lithology by assigned colors to vertices based upon gamma ray tool values within the data received at the data input module 15.

Referring now to FIG. 6, there is illustrated a flow diagram more fully describing the process for generating the quadrangle mesh representing the borehole shape. For each depth measurement, the borehole trajectory is calculated at step 218, and an ellipse 100 is generated at step 220 having the number of vertices 150 as designated by the user and having axes scaled to the diameter measurements for caliper arms 1 and 3 and caliper arms 2 and 4, respectively. The ellipse is centered at the origin and has its axis aligned with the x and y axis of the bounding box. The ellipse is rotated at step 225 about the z (vertical) axis according to the azimuth measurement of caliper 1. The ellipse is again rotated at step 230 to a normal orientation to the borehole trajectory defined by the borehole deviation and azimuth measurements. The ellipse is translated at step 235 to a position normal to the borehole trajectory at the measured depth. Finally, at step 240 the vertices 150 of the ellipse are appended to the mesh interconnecting the ellipse of the stack of ellipses at various depths.

Referring now to FIG. 7, there is a flow diagram more fully describing the process for color mapping the vertices of the borehole quadrangle mesh according to lithology and ellipticity. Initially, the vertices are colored according to the gamma ray values for the borehole at step 244. The maximum and minimum distances between each node point and the center point of an ellipse are next calculated at step 245. The maximum and minimum node points are assigned the designated color intensity for those locations at step 250. The node points between the maximum and minimum values are assigned at step 255 colors between the two color extremes utilizing linear interpolation. The surfaces between node points are assigned there color by interpolating from the colors of each of the node points at step 260.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for generating a three-dimensional graphical representation of a borehole, comprising the steps of:

receiving caliper data relating to the borehole;

generating a three-dimensional wire mesh model of the borehole from the caliper data; and color mapping the three-dimensional wire mesh model from the caliper data based on at least one of borehole ellipticity and lithology.

2. The method of claim 1, wherein the step of generating further comprises the steps of:

orienting the three dimensional wire mesh model in reference to a user defined coordinate system.

3. The method of claim 1, wherein the step of generating further comprises the steps of:

calculating a trajectory of the borehole at selected depths from the calliper data; and generating ellipses normal to the calculated trajectory of the borehole having axes scaled according to the caliper data for each selected depth.

4. The method of claim 3, wherein the step of generating further includes the steps of:

designating a number of vertices for the ellipses; and generating the ellipses having the axes scaled according to the calliper data to include the designated number of vertices.

5. The method of claim 4 further including the step of:

interconnecting the vertices of each of the ellipses at the selected depths to create a three-dimensional polygon wire mesh model.

6. The method of claim 3, wherein the step of color mapping further includes the steps of:

determining distances between a plurality selected points on the ellipse and the center of the ellipse;

determining maximum and minimum distances of the determined distances;

coloring selected points at the maximum distances a first color and selected points at the minimum distances a second color; and coloring a remainder of the plurality of points by interpolation from colors of the selected points at the minimum and maximum distances.

7. The method of claim 6 further including the step of coloring the surfaces between the plurality of selected points by interpolation from the colors of the plurality of selected points.

8. The method of claim 3, wherein the step of color mapping further includes the steps of:

coloring a plurality of selected points on the ellipses based upon gamma ray tool value measurements within the caliper data taken at selected depths.

9. A system for generating a three-dimensional graphical representation file of a borehole, comprising:

means for receiving caliper data relating to the borehole; and means for generating the three-dimensional graphical representation file of the borehole from the caliper data, the file including data for displaying a three-dimensional wire mesh model and data for color mapping the three-dimensional wire mesh model according to at least one of borehole ellipticity and lithology.

10. The system of claim 9 further including:

means for orienting the three dimensional wire mesh mode in reference to a user defined coordinate system.

11. The system of claim 9 further including:

means for enabling user input of variables effecting the generation of the three-dimensional graphical representation file.

12. The system of claim 9, wherein the means for generating further comprises:

first means for generating the data for displaying a three-dimensional wire mesh model from the caliper data; and second means for generating the data for color mapping the wire mesh model from the caliper data.

13. The system of claim 12, wherein the first means for generating comprises:

means for calculating a trajectory of the borehole at selected depths measured by the caliper data; and means for generating ellipses normal to the calculated trajectory of the borehole having axes scaled according to the caliper data at the selected depths.

14. The system of claim 13, wherein the means for generating ellipses is further responsive to a designated number of vertices such that the generated ellipse contains the designated number of vertices.

15. The system of claim 13, wherein the first means for generating further includes:

means for interconnecting the ellipses at the selected depths at a plurality of preselected points to create the three-dimensional wire mesh model.

16. The system of claim 12, wherein the first means for generating further includes:

means for generating a bounding box within which the three-dimensional wire mesh model is generated.

17. The system of claim 12, wherein the second means for generating is further configured to determine distances between a plurality of selected points on the ellipses, color maximum determined distances a first color, color minimum determined distances a second color and interpolate colors of a remainder of the plurality of selected points from the colored maximum and minimum distances.

18. The system of claim 17 further including means for determining colors of surfaces between the plurality of selected points by interpolating from the assigned color of the plurality of selected points.

19. The system of claim 12, wherein the second means for generating is further configured to color a plurality of selected points based upon gamma ray tool value measurements within the caliper data taken at selected depths.

20. The system of claim 12 further including means for generating an indication of an orientation of caliper arm 1 from the caliper data.

21. The system of claim 12 further including means for generating an indication of a high side of a non-vertical portion of the borehole.

22. The system of claim 12 further including means for altering a coordinate system in which the three-dimensional wire mesh model is represented.

23. An article of manufacture for generating a three-dimensional graphical representation file of a borehole, comprising:

a computer readable storage medium;

a computer program stored on said storage medium;

wherein said computer programming is configured to be readable from said computer readable storage medium by a processor and thereby cause said processor to operate so as to:

receive caliper data relating to the borehole;

receive user designated variables relating to the generation of the three-dimensional graphical representation file;

calculate a trajectory of the borehole at selected depths from the caliper data;

generate ellipses normal to the calculated trajectory of the borehole having axes scaled according to the caliper data at the selected depths and having a number of vertices as indicated by the user designated variables;

interconnect the vertices of the ellipses to generate a wire mesh model; and color map the wire mesh model.

24. The article of manufacture of claim 23, wherein the computer programming is further configured to cause said processor to:

orient the three dimensional wire mesh model in reference to a user defined coordinate system.

25. The article of manufacture of claim 23, wherein the computer programming is further configured to cause said processor to:

determine distances between a plurality selected points on the ellipse and the center of the ellipse;

determine maximum and minimum distances of the determined distances;

color selected points at the maximum distances a first color and selected points at the minimum distances a second color; and color a remainder of the plurality of points by interpolation from colors of the selected points at the minimum and maximum distances.

26. The article of manufacture of claim 25, wherein the computer programming is further configured to cause said processor to:

determine colors of surfaces between the plurality of selected points by interpolating from the assigned colors of the plurality of selected points.

27. The article of manufacture of claim 23, wherein the computer programming is further configured to cause said processor to:

generate a bounding box within which the three-dimensional wire mesh model is generated.

28. The article of manufacture of claim 23, wherein the computer programming is further configured to cause said processor to:

color a plurality of selected points on the ellipses based upon gamma ray tool value measurements within the caliper data taken at selected depths.

29. The article of manufacture of claim 23, wherein the computer programming is further configured to cause said processor to:

generate an indication of an orientation of caliper arm 1 from the caliper data.

30. The article of manufacture of claim 23, wherein the computer programming is further configured to cause said processor to indicate a high side of a non-vertical portion of the borehole.

* * * * *